United States Patent [19]

Gilardoni et al.

[11] 4,270,158

[45] May 26, 1981

[54] SYSTEM OF PROTECTION AGAINST SHORT CIRCUITS AND FULMINATIONS

[75] Inventors: Giovanni Gilardoni; Sergio Gilardoni, both of Lodi, Italy

[73] Assignees: Antonino Ravida; Regina Carla Ezzevalli Ravida, both of Lodi, Italy

[21] Appl. No.: 954,451

[22] Filed: Oct. 25, 1978

[30] Foreign Application Priority Data

Nov. 3, 1977 [IT] Italy .................. 29305 A/77

[51] Int. Cl.³ ............................................. H02H 3/16
[52] U.S. Cl. ...................................... 361/42; 361/178
[58] Field of Search .................. 361/1, 42, 49, 50, 47, 361/48, 178, 179; 307/118; 174/181, 14 R, 18, 50.56, 5 R, 5 SB; 200/51 R, 61.05, 61.04, 61.06

[56] References Cited

U.S. PATENT DOCUMENTS

| | | | |
|---|---|---|---|
| 2,614,200 | 10/1952 | McNair | 361/42 X |
| 3,525,902 | 8/1970 | Davidson et al. | 361/178 |
| 3,728,581 | 4/1973 | Adamo | 361/50 |
| 3,864,581 | 2/1975 | Satyanarayana | 361/42 X |
| 4,013,924 | 3/1977 | Christensen et al. | 361/49 |

*Primary Examiner*—Patrick R. Salce
*Attorney, Agent, or Firm*—Stevens, Davis, Miller & Mosher

[57] ABSTRACT

The present invention refers to a system of protection against electric current short circuits and fulminations, apt to be applied on any installation comprising an electric apparatus and a polyphase feeding cable connecting said apparatus to a socket through connection means. According to the invention, the installation comprises a screening of the electric apparatus and/or of the feeding cable, formed by a pair of spaced wire nets being electrically insulated one from the other, a two-phase auxiliary electric line with each phase connected to one of said wire nets, and a cutout circuit associated to said connection means for disconnecting the electric feeding in response to a short circuit between said two wire nets.

12 Claims, 3 Drawing Figures

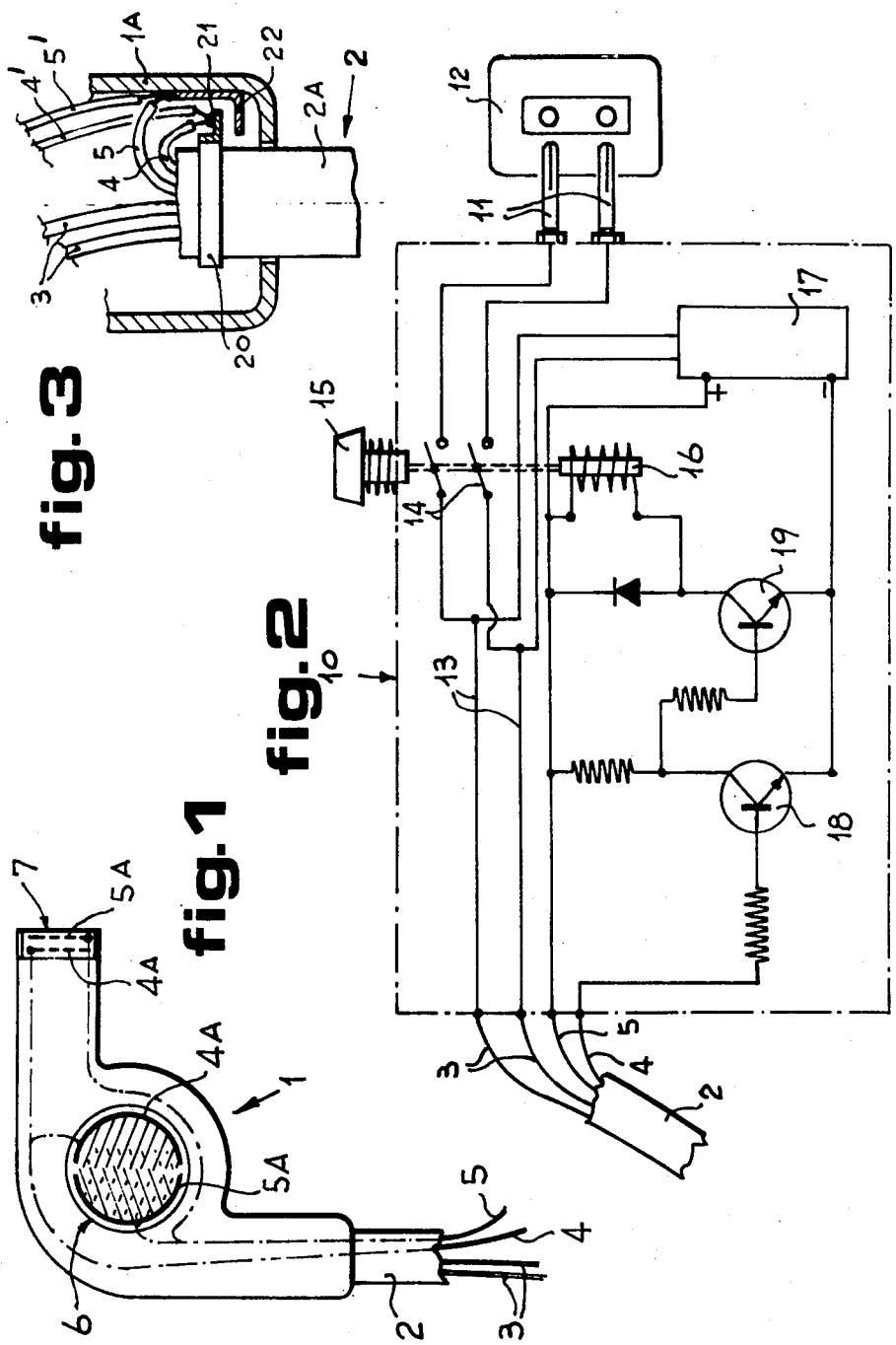

SYSTEM OF PROTECTION AGAINST SHORT CIRCUITS AND FULMINATIONS

BACKGROUND OF THE INVENTION

It is known that modern technique has supplied a large quantity of apparatuses based on the use of electric current; and this not only on a technical or industrial level, but also at any other level, as for schools, homes and so on.

Apart from a few cases of entirely sealed apparatuses, most of these apparatuses provide for no safe protection against electric current fulminations. In other words, there are many apparatuses having a structure such as to make it possible to create a contact—either directly or indirectly—between one part of the human body, particularly a hand of the user, and parts of the apparatus conducting electric current. In this case, the effects on the human body may either be very weak—as a simple electric shock—or most serious, as scalds or fulminations.

It should be noted in particular that, even if some electrically fed apparatuses have a structure such as not to allow a direct contact of the user's hand with electrically conductive parts, they however provide for no protection—nor is it on the other hand possible in certain cases—against an indirect contact, as may happen for example for the conduction produced by humidity or by water drops penetrating into the apparatus.

To make the above more clear, we can refer to a typical example of domestic apparatus being subject to the aforementioned drawbacks, and precisely to electric hair-driers, or to an equally typical example of industrial apparatus being subject to the same drawbacks, and precisely to cement mixers, particularly the small electrically fed mixers for building yards. It is obvious however that these examples have to be considered as purely indicative, since there are very many apparatuses involving the same problems.

For what concerns a hair-drier type apparatus, the danger derives from several circumstances:

—to start with, it is an apparatus which undergoes lots of movements during which the feeding cable is repeatedly bent in opposite directions and is hence subject, especially near the handgrip, to the breaking of the protection sheath: any uncovered wires in said position may easily cause electric discharges on the operator's hand, or short circuits;

—even supposing that the wire is in perfect order, or that it is replaced as soon as it shows wear or ageing, the apparatus itself is of an essentially open type—just in relation to its function of heating and circulating air—and its openings lead directly onto electrically conductive parts, as the electric motor of the fan, or the electric heating element. Though excluding the possibility that the user might introduce a finger in such openings—which possibility should not really be excluded considering that such an apparatus may easily get into the hands of children—it is still certain that the steam present in a bath-room, or the humidity of the hands of those who have just washed their hair, or any water drops which might fall from the hair into the apparatus, are all elements which may lead to the conduction of electric current out of the apparatus itself, with consequent risks of fulminations. Nor can one fully exclude the possibility that an apparatus of this type may accidentally fall into the bath water while someone is having a bath, and in this case the risk of fulmination is even higher.

Substantially the same dangers occur, in the industrial field, when using an electric cement mixer. In this case, in fact, the motor for dragging the mixer is normally contained in a box which— in order to allow a sufficient cooling of the motor itself—is provided with a number of openings. Though excluding, also in this case, that the operator might be so careless as to introduce some electrically conductive element, or even his fingers, into said openings, it is undoubted that—both when filling the mixer with cement and water, and when possibly washing the mixer with a water-spout—the danger that an electric current discharge may reach the operator, due to water conduction, should by no means be neglected.

A further danger derives moreover—in both the aforecited cases, as well as in all those cases in which the flexible feeding cable undergoes easy wear—from the fact that the insulation coating of said feeding cable may get peeled or torn, thus exposing the metallic conductive part of the cable itself. In this case, a direct contact—or even an indirect contact, for example through water conduction—of this exposed metal part, undoubtedly represents a risk of fulmination, as well as of short circuit.

SUMMARY OF THE INVENTION

The object of the present invention is to realize a system apt to eliminate almost entirely both this type of risk of fulminations and also the risk of short circuits.

The object of the present invention is therefore a system of protection, apt to be used in an installation comprising in particular an electric apparatus, and a polyphase feeding cable connecting said apparatus to a fixed socket through connection means, as for example a connecting plug, known per se, said protection system being essentially characterized in that it comprises a screening of the electric apparatus and/or of the feeding cable, formed by a pair of spaced wire nets being electrically insulated one from the other, a two-phase auxiliary electric line, with each phase being respectively connected to one of said two wire nets, and a cutout circuit, associated to said connection means for disconnecting the electric feeding in response to a short circuit between said two wire nets.

BRIEF DESCRIPTION OF THE DRAWINGS

Further characteristics and advantages of the system according to the present invention will anyhow be evident from the following description of a preferred embodiment, given however by mere way of example and illustrated with reference to the accompanying drawings, in which:

FIG. 1 is a very schematic side view of a widely spread type of electric apparatus, protected with a system according to the present invention;

FIG. 2 is a diagram of the safety electric circuit according to the invention; and FIG. 3 shows a detail of the connection of the electric current feeding cable to the electric apparatus.

DESCRIPTION OF THE PREFERRED EMBODIMENTS

The electric apparatus shown in FIG. 1 is a hair-drier 1. This apparatus is fed by a four-phase cable 2, of which two are the phases of the main feeding line for operating the fan motor, and the other two are the phases of the auxiliary electric line (in the event of three-phase current fed apparatuses for industrial use, a five-phase cable will evidently be used). The two phases 3 of the main feeding line are not represented more clearly, and also the fan motor is not represented, in that these arrangements are quite common.

The two phases 4 and 5 of the auxiliary line are instead each connected—as shown in the drawing—to a wire net of a pair of wire nets 4A, 5A, provided in correspondence of each opening of the apparatus. In the case of the illustrated hair-drier, the only two openings of the case—which for the remaining part can be considered sealed, or can anyhow be produced sealed and of electric insulating material—are the opening 6 for the inlet of room air, and the opening 7 or the outlet o heated air.

In correspondence of each of the two openings 6 and 7 is hence mounted a pair of wire nets 4A, 5A, electrically insulated one from the other and connected respectively to the phases 4 and 5 of the auxiliary line.

The cable 2 extends up to a box 10, into which is enclosed the electronic protection circuit, and from which projects the pair of plugs 11 for insertion in a socket 12.

The box 10 contains first of all a main line 13, which in the case illustrated is a two-phase line, but which could also certainly be a three-phase line in the case of industrial apparatuses, as already stated. The line 13 connecting the electrical plug 11 to the two phases 3 of the cable 2, is disconnected—inside the box 10—by a switch 14, being associated on one side to a switching-on push button 15, which projects outwardly of the box 10, and on the other side to a holding relay 16.

The relay 16 is controlled by an electronic circuit fed by a transformer-rectifier 17, which is in turn connected to the line 13 downstream of the switch 14, and the output of which supplies an auxiliary voltage, preferably a low-tension direct current voltage, being actually apt to feed the electronic circuit shown.

This circuit practically consists of a two-stage amplifier comprising a first transistor 18 and a second power transistor 19, the output of which controls the relay 16 in the manner better described hereinafter.

On the input of the transistor 18 are connected the two phases 4, 5, of the auxiliary line leading to the pair of wire protection nets 4A, 5A.

The working is as follows: when having to use the apparatus, the box 10 is brought close to the socket 12 and the plug 11 is introduced into the socket 12 itself. The switch 14 is now off: the mains voltage current—for example 220 or 380 V—therefore feeds only the line 13 upstream of the switch 14.

By subsequently pressing the push button 15, the switch 14 is switched on and the electric current immediately feeds:

on one side, the transformer-rectifier 17 and hence the electronic circuit: at this moment, since the wire nets 4A and 5A are insulated one from the other, the transistor 18 is cut off, the transistor 19 leads, the relay 16 is energized and holds the switch 14 on;

on the other side, the main line 13 and the conductors 3 of the cable 2, through the switch 14 which is on.

As soon as the switch 14 has been switched on, by pressing the push button 15, the main line is fed and it is then possible to start or stop the apparatus at will, by operating a further switch provided—in a manner known per se and hence not shown—along the feedng cable or directly on the apparatus itself.

As soon as a drop of water falls on the pair of wire nets 4A and 5A, it forms an electric bridge between said two nets, short-circuiting the two phases 4 and 5. At this moment, the transistor 18 starts to conduct, the transistor 19 is cut off and the relay 16 is de-energized. The switch 14 then immediately trips, turning off the power both on the main line 3, 13, and on the auxiliary line 4, 5.

It has been tested in practice that, through an appropriate sizing of the meshes of the two wire nets—for example, square meshes with sides of 1 to 4 mm. and preferably of 2 mm.—and through an appropriate reciprocal spacing of said nets, for example of the order of 0.1 to 2 mm., the short circuit between the two phases 4 and 5 is produced with a high sensitivity, not only for the fall of a lot of water onto the wire nets, but also for the fall of a single drop of water or for the forming of a sufficient layer of humidity.

It should further be noted that, once the short circuit between the two phases 4 and 5 has taken place, it is necessary for the two wire nets to return perfectly dry in order to enable the apparatus to be put in service again by a new pressure onto the push button 15, this feature representing a significant margin of safety.

It is moreover important to note that, at the moment of the short circuit between the phases 4 and 5, the tripping of the switch 14 turns off the power not only from the apparatus, but also from the entire current supply cable between the apparatus itself and the power socket 12, thanks to the fact that the switch 14 is actually close to the plug 11.

It should finally be noted, moreover, that the type of circuit proposed by the present invention has the great advantage that, in the event of interruption or damage of one of its components, since it is no longer in a position to work, it fully excludes that the relay may be energized and that the feeding of the apparatus may take place.

In addition, the protection against fulminations and short circuits is completed—according to a particular aspect of the present invention—by the screening not only of the apparatus, but also of the feeding cable 2. For such a screening, the cable 2 may be formed with the different phase conductors 3 joined into a central core surrounded by two wire nets of tubular shape, being concentric and separated by an insulating layer to constitute the two phases 4 and 5. When, for reasons of wear, or due to squashing, or even as a result of accidental shearing, the external coating of the cable were to get destroyed, and thus equally the layer separating the two nets, these last ones would short-circuit due to direct mutual contact, or to contact through the tool which might have accidentally produced the shearing. Such contact then immediately cuts off the feeding, and this even before wear, squashing or shearing might affect the inner coating of the phase conductors of the cable, so as to avoid any risk of fulminations and/or of short circuits on the main line.

According to a first embodiment of the invention, a single pair of concentric tubular wire nets may form a screening for the group of two or three phases 3 of the feeding cable; or else, according to a further embodiment, a pair of concentric tubular wire nets may form the screening for each single phase, that is to say, each phase conductor of the feeding cable is surrounded by a pair of screening wire nets of its own. This second solution constitutes a higher protection, since it prevents short circuits and/or risks of fulminations even in the event of wear or breakage of the inner insulating layers of the cable, without a corresponding breakage on the outer part, as it happens when the insulation of the single phases melts under the effect of an exceedingly high temperature.

In either one of the two aforecited embodiments, it is possible to use one of the two tubular nets—and preferably the outer net—as earth wire of the main feeding line; it is evident that, in this case, said wire net will have to be appropriately sized.

FIG. 3 shows the detail of a connection of the feeding cable 2 to the apparatus 1. As shown, on the terminal end of the outer coating 2A of the cable 2 is fixed a ring 20, or the like, bearing a first metal contact 21; a second metal contact 22 is fixed on the case 1A of the apparatus 1, close to the hole for inlet of the cable 2.

To the two contacts 21 and 22 are welded the ends of the conductors 4 and 5 of the auxiliary line, which then extend further along into 4' and 5' towards the nets 4A and 5A.

In the event of the cable 2 undergoing an accidental tearing action tending to pull it out of the case 1—which might obviously cause a short circuit between the main phases 3—the contact 21 is immediately dragged against the contact 22, shortcircuiting the phases 4 and 5. This causes—in an identical manner as seen heretofore—the operation of the circuit 18, 19, 16, and the switching-off of the switch 14. Hence, the consequent current cutoff on all the phases 3, 4, 5, downstream of the switch 14, takes place before the cable 2 has been completely pulled out of the case 1, and thus before any danger of short circuits taking place on the main line 3.

It is anyhow understood that the invention is not limited to the particular embodiment described, with reference to the drawings, since an electronic circuit apt to perform the function of the heretofore described circuit can be realized in a great number of different embodiments, as any electronic technician will be capable of doing, without thereby departing from the scope of the present invention.

We claim:

1. Electronically fed apparatus protected against electric current short circuits, comprising a case defining openings therein and containing an electrical operating unit, a multiconductor feeding cable for a main feeding line connected to said operating unit, a two-conductor auxiliary elecrical line, connecting means for connecting said operating unit to a socket through said feeding cable, a pair of reciprocally spaced and electrically insulated wire nets screening each opening of the case, said auxiliary electrical line having each conductor connected to one of said wire nets, a switch connected to said main feeding line to disconnect each of the conductors of at least the main feeding line, a relay for holding said switch in a switched on position, a low tension auxiliary source consisting of a transformer means fed by said main feeding line downstream of said switch from a current supplied by said switch and an electronic cooperating circuit, said auxiliary source feeding said auxiliary electrical line and said relay through said electronic cooperating circuit, said electronic cooperating circuit being controlled by a short-circuit signal coming from said auxiliary electrical line for interrupting an electric current through said relay whereby said switch opens disconnecting the operating unit and auxiliary source from a source of voltage.

2. Apparatus as in claim 1, including a box wherein the switch, the relay, the auxiliary tension source and the electronic cooperating circuit are contained in said box, said box being directly associated to said means of connection to the socket.

3. Apparatus as in claim 2, wherein said connection means consist of a connecting plug, fixed on said box.

4. Apparatus as in claim 1, wherein said wire nets have meshes with a diameter, or side, of 1 to 4 mm., and preferably meshes with a side of 2 mm.

5. Apparatus as in claim 1, wherein said wire nets are spaced by 0.1 to 2 mm.

6. Apparatus as in claim 1, wherein said wire nets are in the shape of tubular braidings surrounding the feeding cable, and are kept mutually insulated by a layer of insulating material.

7. Apparatus as in claim 6, wherein a pair of tubular braidings encloses all the phase conductors of the main feeding line.

8. Apparatus as in claim 6, wherein a pair of tubular braidings is provided for enclosing each of the phase conductors of the main feeding line.

9. A multiconductor electric current feeding cable, particularly for use in a protection system as in claims 6 or 7, characterized in that a group of conductors is enclosed within a pair of concentric tubular braidings, reciprocally spaced by a layer of insulating material.

10. Polyphase electric current feeding cable, particularly for use in a protection system as in claims 6 or 8, characterized in that each of the conductors is enclosed within a pair of concentric tubular braidings, reciprocally spaced by a layer of insulating material.

11. Polyphase electric current feeding cable as in claim 9, wherein one of the tubular braidings constitutes an earth wire of the cable itself.

12. Apparatus as in claim 1, including a first electric contact associated at the end of the feeding cable inside the case of the electric apparatus, and a second electric contact fixed to the inside of the case, in a position close to said first contact and such that movement of the cable end outwardly of the case will effect an approaching of said first and second contact, to which are connected respectively the two conductors of said auxiliary electric line, thereby providing a short circuit.

* * * * *